US00RE44130E

(19) United States
(12) Reissued Patent
Lucero et al.

(10) Patent Number: US RE44,130 E
(45) Date of Reissued Patent: Apr. 2, 2013

(54) ANTI-PIRATE CIRCUIT FOR PROTECTION AGAINST COMMERCIAL INTEGRATED CIRCUIT PIRATES

(75) Inventors: Elroy M. Lucero, San Jose, CA (US); Daniel J. Lucero, San Jose, CA (US); Hengyang (James) Lin, San Ramon, CA (US); Andrew J. Franklin, Santa, CA (US); Pavel Poplevine, Burlingame, CA (US)

(73) Assignee: National Semiconductor Corporation, Santa Clara, CA (US)

(21) Appl. No.: 13/011,649

(22) Filed: Jan. 21, 2011

Related U.S. Patent Documents

Reissue of:
(64) Patent No.: 7,558,969
Issued: Jul. 7, 2009
Appl. No.: 10/383,416
Filed: Mar. 6, 2003

(51) Int. Cl.
*G06F 11/07* (2006.01)

(52) U.S. Cl. ..... 713/193; 713/194; 726/32; 726/33

(58) Field of Classification Search ..... 726/26, 726/33, 34; 713/193, 194; 708/190, 135; 326/8; 716/51, 52, 106, 107
See application file for complete search history.

(56) References Cited

U.S. PATENT DOCUMENTS 5,034,980 A * 7/1991 Kubota ..... 713/189
5,208,447 A * 5/1993 Kruse ..... 235/380
5,467,396 A * 11/1995 Schossow et al. ..... 713/193
6,240,517 B1 * 5/2001 Nishioka ..... 726/20
6,384,713 B1 * 5/2002 Yu ..... 340/146.2
6,802,447 B2 10/2004 Horng
6,941,536 B2 9/2005 Muranaka
6,973,570 B1 * 12/2005 Hamlin ..... 713/168
7,143,294 B1 * 11/2006 Johnson ..... 713/189
7,282,377 B2 10/2007 Muranaka
RE40,188 E 3/2008 Lofstrom
7,681,103 B2 3/2010 Devadas et al.
7,757,083 B2 7/2010 Devadas et al.
7,818,569 B2 10/2010 Devadas et al.
7,840,803 B2 11/2010 Clarke et al.
2004/0170068 A1 * 9/2004 Williams ..... 365/200

* cited by examiner

*Primary Examiner* — Edward Zee
(74) *Attorney, Agent, or Firm* — Alan A. R. Cooper; Wade J. Brady, III; Frederick J. Telecky, Jr.

(57) ABSTRACT

Anti-pirate circuitry is provided for combating the theft of intellectual property contained with semiconductor integrated circuits. The anti-pirate circuit includes a unique number generator that provides a multi-bit die ID data string that is unique to the integrated circuit associated with the anti-pirate circuit. One time programmable (OTP) EPROM circuitry reads the die ID data string at wafer sort and writes the data content to nonvolatile memory. During a subsequent verification cycle, ID comparator circuitry compares the data string provided by the unique number generator to the stored contents of the nonvolatile memory. If the comparison results in a mismatch between more than a predefined number of bits, then the integrated circuit associated with the anti-pirate circuit is not enabled for operation.

46 Claims, 6 Drawing Sheets

-AMENDED-

-AMENDED-

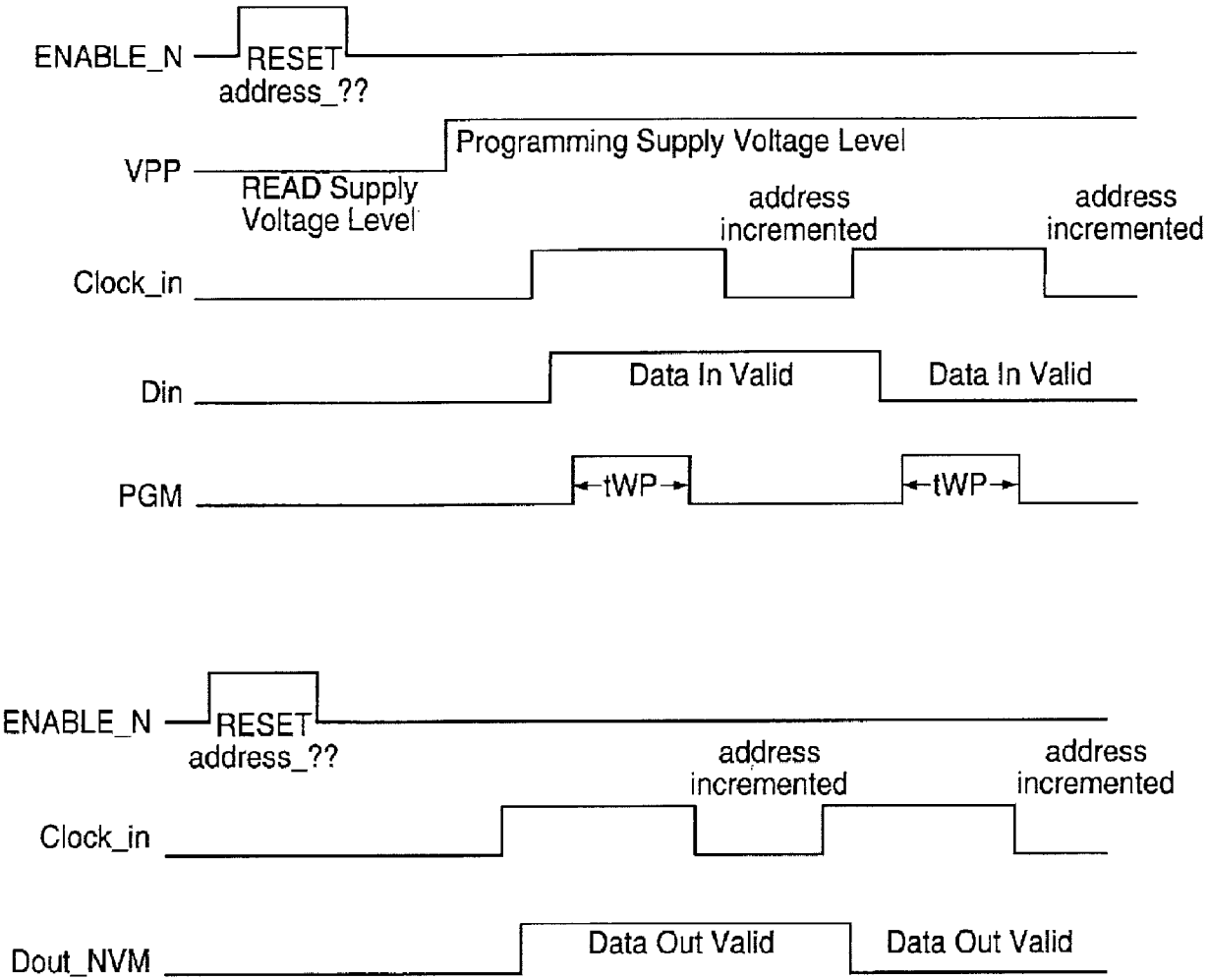
FIG. 3a(1)
FIG. 3a(2)
FIG. 3a(3)
FIG. 3a(4)
FIG. 3a(5)
FIG. 3b(1)
FIG. 3b(2)
FIG. 3b(3)

Note: Coding can be modified as desired

ANTI-PIRATE CIRCUIT FOR PROTECTION AGAINST COMMERCIAL INTEGRATED CIRCUIT PIRATES

Matter enclosed in heavy brackets [ ] appears in the original patent but forms no part of this reissue specification; matter printed in italics indicates the additions made by reissue.

*CROSS-REFERENCE TO RELATED APPLICATIONS*

*This is a reissue application of U.S. patent application Ser. No. 10/383,416 that was filed on Mar. 6, 2003 (which issued as U.S. Pat. No. 7,558,969 that issued on Jul. 7, 2009).*

TECHNICAL FIELD OF THE INVENTION

The present invention relates to semiconductor integrated circuits and, in particular, to circuitry that combats the theft of intellectual property contained within integrated circuits.

BACKGROUND OF THE INVENTION

The anti-pirate circuitry disclosed herein is intended to combat the theft of intellectual property contained within integrated circuits (IC), such as patent protected circuits, copyrighted works, mask works and computer software.

Unfortunately, the theft of integrated circuit technology is not always prevented by the existence of legal barriers to its use. While a new circuit design may have significant commercial value, it may not be possible or practical to obtain or enforce patent rights in all countries of the world in which the circuit will be made, sold or used. While mask work and copyright protection may be available even if patent protection is not, the pirating and unauthorized copying of integrated circuit designs continues to cause serious economic harm to the original developers and owners of IC intellectual property.

It would, therefore, be highly desirable to have available a low cost, but effective technique for combating IC pirates.

SUMMARY OF THE INVENTION

An anti-pirate circuit in accordance with the present invention includes unique number generator circuitry, one time programmable (OTP) EPROM circuitry and ID comparator circuitry. The unique number generator circuitry provides a multi-bit die ID data string that is unique to the integrated circuit associated with the anti-pirate circuit. The OTP EPROM circuitry reads the die ID data string from the unique number generator at wafer sort and stores the die ID data string in a nonvolatile memory. During a subsequent verification cycle, the ID comparator circuitry compares the die ID data string provided by the unique number generator to the data content stored by the OTP EPROM. If the comparison results in a mismatch between more than a predefined number of bits, then the IC associated with the anti-pirate circuit is not enabled for operation.

The disclosed anti-pirate circuit does not make the pirating or copying of the IC mask set any more difficult. Rather, it forces the pirate to not only duplicate the IC mask set, but also duplicate a large portion of the product manufacturing flow, including hardware (fabrication and test equipment) and software (wafer sort test software). Although there is no perfect hardware/software anti-piracy circuit, the circuit of the present invention forces the pirate to invest so much time and money to "crack" the product that it renders the theft economically non-viable. The protection provided by this circuit is nearly absolute for most commercial IC pirates.

The features and advantages of the present invention will be more fully understood and appreciated upon consideration of the following detailed description and the accompanying drawings which set forth an illustrative embodiment in which the principles of the invention are utilized.

BRIEF DESCRIPTION OF THE DRAWINGS

FIG. 3A is a set of programming waveforms illustrating a programming operation for a one time programmable (OTP) EPROM utilizable in accordance with the concepts of the present invention.

FIG. 3B is a set of read waveforms illustrating a read operation for a one time programmable (OTP) EPROM utilizable in accordance with the concepts of the present invention.

DETAILED DESCRIPTION OF THE INVENTION

An anti-pirate circuit in accordance with the present invention, when added to an integrated circuit chip, requires that the manufacturer add steps to the product development and test flow. These extra steps are not expensive to the manufacturer because the circuitry itself is small and, in most cases, the manufacturer must already test the chip before packaging (i.e., wafer sort tests).

As discussed in greater detail below, the anti-pirate circuit is interrogated at wafer sort to determine the chip's die ID and then the die ID is programmed into the anti-pirate circuit's nonvolatile memory. Not until this Read/Program cycle is completed, and a subsequent verification cycle is also successfully completed, is the chip's original operational circuitry allowed to function correctly. In other words, the anti-pirate circuit is a type of "chip enabler" that is activated at wafer sort.

These extra steps require the IC pirate to not only duplicate the IC mask set, but the pirate must also duplicate the wafer sort equipment and at least a portion of the wafer sort test program before the pirated mask set can be used to produce activated (working) chips.

An embodiment of an anti-pirate circuit in accordance with the present invention will now be described twice: first at the block level so that the concepts employed will be understood, and second, at the gate level.

Figure 1:
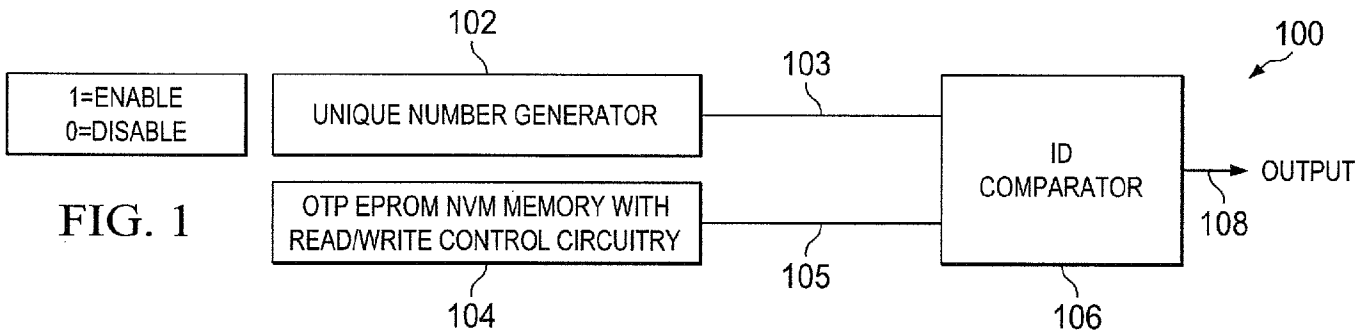
FIG. 1 is a block diagram illustrating an embodiment of an anti-pirate circuit in accordance with the present invention.

As shown in FIG. 1, an embodiment of an anti-pirate circuit 100 in accordance with the present invention includes three primary circuit blocks: a 256 bit unique number generator 102, a one time programmable (OTP) electrically programmable read only memory (EPROM) 104, and an ID comparator 106.

The unique number generator circuitry 102 provides a 256-bit data string referred to herein as the "die ID." The die ID is unique to each and every IC die, i.e., no two IC dice have the same die ID. Those skilled in the art will appreciate that the die ID data string is not required to be 256 bits, but may be longer or shorter depending upon the desired level of security.

The 256 bit OTP EPROM circuitry 104 is a non-volatile memory that is only programmable at wafer sort. The OTP EPROM 104 contains all the logic necessary to read the data contents, i.e., the die ID, provided by the unique number generator 102 and to transfer this data to the non-volatile memory (i.e., READ/WRITE logic.) If the general logic of the chip already includes a non-volatile memory, then the OTP EPROM 104 can be instantiated as a portion of that memory; as stated above, the OTP EPROM portion of the non-volatile memory is, preferably, only programmable at wafer sort. Note that "imbedding" the OTP EPROM 104 within the general logic of the chip serves to "hide" it's location and purpose, making it more difficult to reverse engineer and defeat.

During the verification cycle, described in greater detail below, the ID comparator 106 compares the die ID data string from the unique number generator 102 to the stored data contents of the OTP EPROM 104. Note that, in the disclosed embodiment of the invention, the stored data can vary by as much as 31 bits and still be considered a "match" with the die ID data string; if the stored data vary by more than 31 bits, then a "mismatch" is declared. As with the OTP EPROM 104, preferably, the ID comparator 106 is "imbedded" within the general logic of the chip, thereby "hiding" its location and purpose, making it more difficult to reverse engineer and defeat. Furthermore, for maximum protection, portions of the ID comparator 106 circuitry can be made to have a dual purpose (i.e., part of the anti-pirate circuit 100 and also a fundamental part of the general logic of the chip). If this is the case, then disabling the anti-pirate function of the ID comparator 106 also disables the general logic of the chip.

At wafer sort, the die ID data string is read from the unique number generator 102 and programmed into the OTP EPROM 104. Since the OTP EPROM 104 can only be programmed at wafer sort, this operation must be performed and verified before packaging of the IC chip. Before correct operation of the chip can begin, the ID comparator 106 must compare the die ID contents of the unique number generator 102 to the stored data content of the OTP EPROM 104. If the ID's are declared a "match", then the output 108 of the ID comparator 106 is driven "active", shown in FIG. 1 as "high", to enable correct operation/function of the IC on the chip. If the ID's are declared a "mismatch", then the output 108 is driven "inactive", shown as "low" in FIG. 1, to disable correct operation/function of the IC on the chip. Thus, a successful "read-program-compare-match" operation "enables" the chip so that the remainder of the wafer sort tests can be completed normally. After assembly, only the "compare-match" portion of the sequence need be completed successfully in order to enable correct operation/function of the chip.

In the disclosed embodiment of the invention, the unique number generator 102 is a serial 256-bit read only memory. The data contents of the memory is unique to each and every die and is determined by the electrical "mismatch" of MOS transistors. As stated above, the 256-bit data string is referred to as the die ID. The die ID is very stable, but statistically as many 24 bits can change from one read cycle to another. In the disclosed embodiment of the invention, a die ID "match" is declared when the number of mismatched bits is less than 32.

Figure 2A:
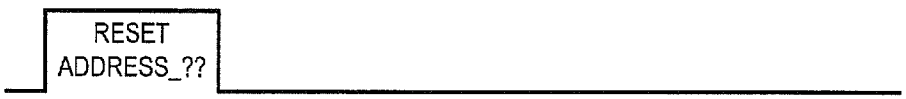
FIGS. 2A, 2B and 2C are a set of read waveforms illustrating a read operation for a unique number generator utilizable in accordance with the concepts of the present invention.
Figure 2B:
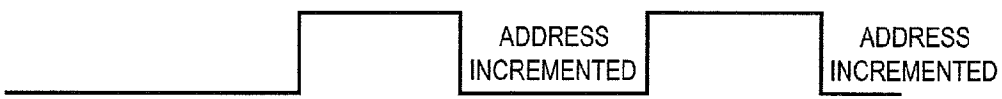
Figure 2C:
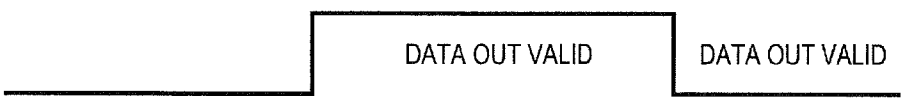
Figure 4:
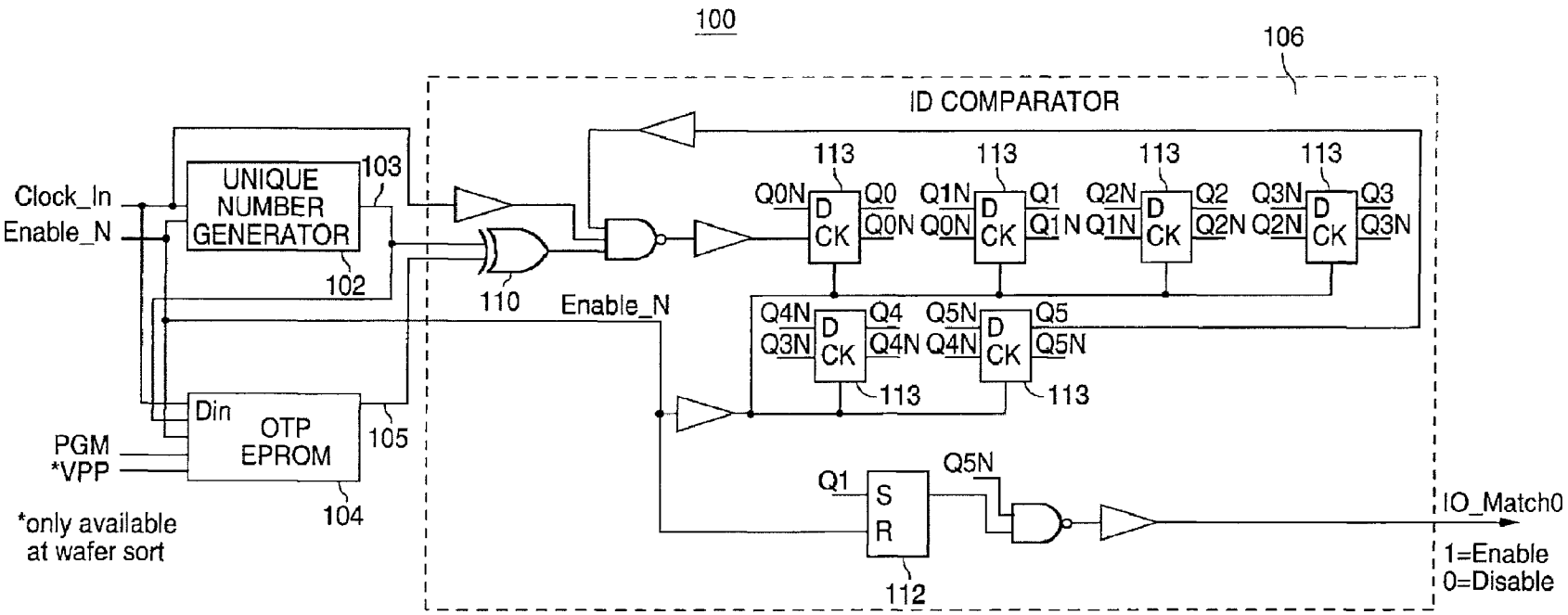
FIG. 4 is a gate level diagram illustrating an embodiment of an anti-pirate circuit in accordance with the present invention.

Referring to the FIG. 2 waveforms and to the FIG. 4 circuitry, the unique number generator 102 is read by taking the ENABLE_N signal "high" to reset the address counter in the ID comparator 106 to "address_0", then taken "Low" to enable the unique number generator 102 for a read operation. The Clock_In signal is clocked at 5 MHZ and data is presented at the output (Dout_UNG) 103 of the unique number generator 102 on every rising edge of the Clock_In signal. The internal address counter is incremented on every falling edge of the Clock_In signal line.

The OTP EPROM 104 is a 256-bit serial access non-volatile memory. In the well known manner, it contains all the circuitry required to write a data pattern into the memory and to read the pattern from the memory. Referring to the programming waveforms of FIG. 3a, the OTP EPROM 104 is reset/enabled by taking the ENABLE_N signal "high" to reset the address counter to "address_0", then taken "low" to enable the memory for a read or write cycle. For the write cycle, the VPP input to the OTP EPROM 104 is driven to the programming supply voltage level. Clock_In is driven "high" to enable the data input signal Din for programming into the memory. The PGM signal line is then driven "high" for the program pulse width time tPW. Clock_In is then driven "low" to increment the address counter. The sequence is repeated on the next rising edge of the clock until the entire memory is programmed.

Referring to FIG. 3b, for the read cycle, VPP is held at the read supply voltage level and PGM is held "low." Similar to the unique number generator 102, the Clock_In signal is clocked at 5 MHZ and data is presented at the output (Dout_NVM) 105 of the OTP EPROM 104 on every rising edge of the Clock_In signal. The internal address counter is incremented on every falling edge of the Clock_In signal.

As stated above, the ID comparator 106 compares and counts the number of mismatched bits presented by the unique number generator 102 and the OTP EPROM 104. As shown in FIG. 4, the two data streams, Dout_UNG 103 and Dout_NVM 105, are compared using a two input XOR gate 110 during the low phase of the clock. Data is presented to the ID comparator 106 during the high phase of the clock, but the compare operation is done during the low phase of the clock to ensure that differences between read access timing of the unique number generator 102 and the OTP EPROM 104 do not generate false mismatches. As further shown in FIG. 4, in the disclosed embodiment of the invention, the number of bit mismatches are counted by a simple six stage ripple counter 113. The counter is reset to '000000' when ENABLE_N is "high" and is released to count when ENABLE_N is "low". The counter is triggered by the rising edge of the first CK input stage. Every time a bit mismatch occurs, a 0→1 transition is generated and counted by the counter. When 32 bit mismatches have been counted, counter output Q5 is fed back to the comparator to disable counting and forces the ID Comparator Output, ID_Match, to a "0". This logic state is used by the general logic of the chip to disable correct operation of the chip. If less than 32 bit mismatches occur, counter output Q5 will remain low and the ID Comparator Output, ID_Match, is driven to a "1". This logic state is used by the general logic of the chip to enable correct operation of the chip.

Another feature of the ID comparator 106 is the requirement that the ID comparator circuit 106 count a minimum of two mismatched bits. This is achieved by using an RS Latch 112, which is reset when ENABLE_N is "high" and set when Counter Output Q1, is toggled "high". Therefore, counter output Q1 must toggle to a "1" in order for the ID_Match output to go "high". This feature is added to the logic of the ID comparator 106 in order to make defeating the circuit more difficult. The pirate cannot simply defeat the circuit by forcing both data streams to all "0" or all "1", nor can the pirate force the comparator output "low", nor can the pirate disable the clock. The manufacturer will choose the last nibble of data (ID bits 251-255) to purposely invert before copying into the OTP EPROM 104.

Figure 5:
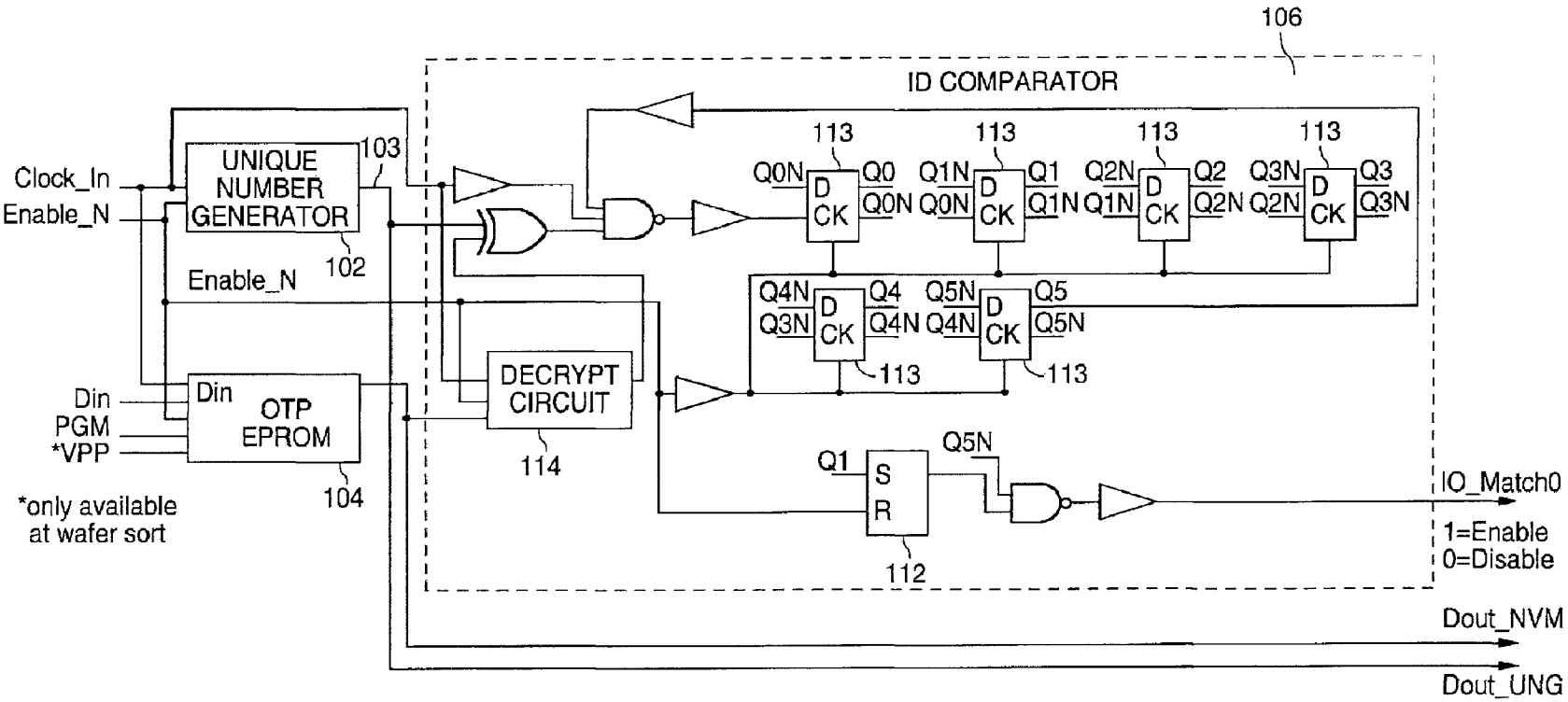
FIG. 5 is a gate level diagram illustrating an embodiment of an anti-pirate circuit in accordance with the present invention with die ID encryption.

The level of security can be increased by utilizing conventional encryption circuitry to encrypt the die ID pattern generated by the unique number generator 102 before programming it into the OTP-EPROM 104. This action will force the IC pirate to decipher the encoding algorithm before the pirate can properly program the OTP EPROM 104 at wafer sort. The downside is that the manufacturer must also include the decryption hardware/software "on chip" to decipher the data pattern produced by the OTP EPROM 104 and reconstruct the original die ID pattern 102 before presenting it to the ID comparator 106. As shown in FIG. 5, the decryption circuit 114 is added to the ID comparator 106 and is again "imbedded" within the general logic of the chip in order to make reverse engineering of the encryption algorithm more difficult.

Figure 6:
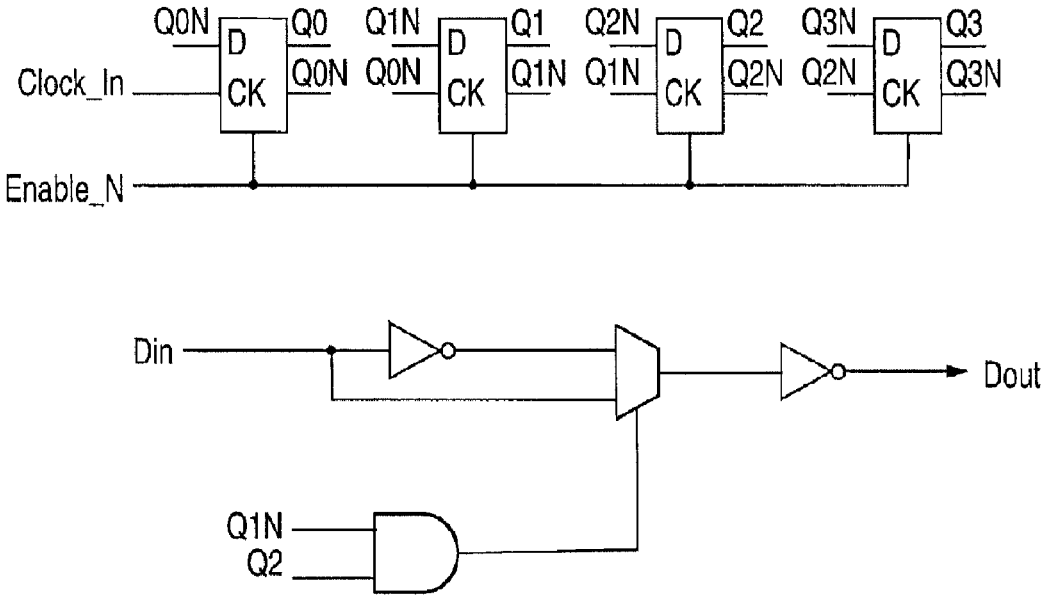
FIG. 6 is a gate level diagram illustrating a decryption circuit utilizable in accordance with the concepts of the present invention.

FIG. 6 shows a simple decryption circuit 114 utilizable in accordance with this aspect of the present invention. The decryption circuit 114 inverts Din every $4^{th}$, $5^{th}$, $12^{th}$ and $13^{th}$ clock cycle (64 bits). Dout is stable during the low phase of Clock_In.

Figure 7:
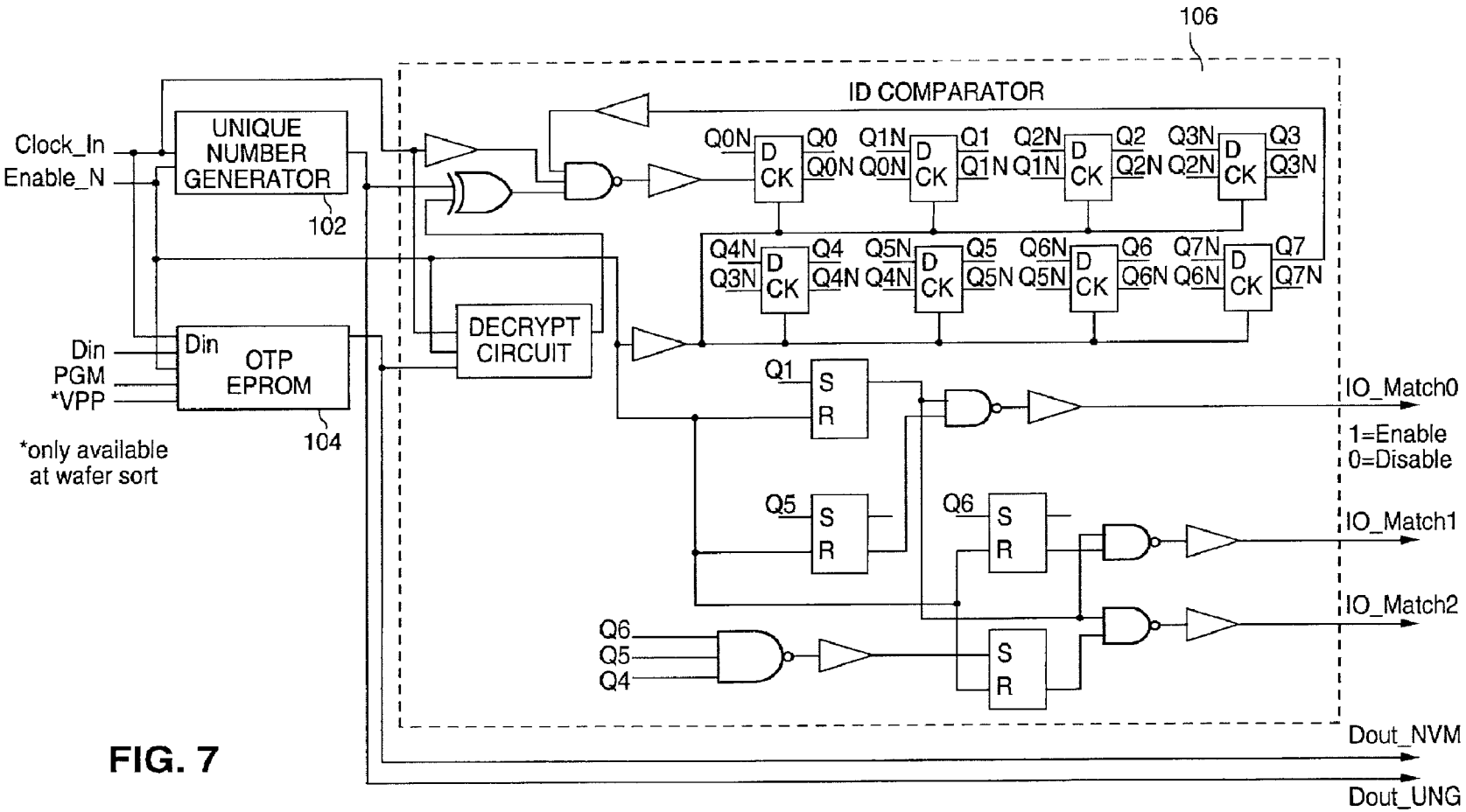
FIG. 7 is a gate level diagram illustrating an embodiment of an anti-pirate circuit in accordance with the present invention with die ID encryption and multiple levels of security/access.

As shown in FIG. 7, the anti-pirate circuit can easily be modified to provide multiple levels of security or multiple levels of access to chip features. This is accomplished by allowing an ID_Match to occur with more (or less) errors during the die ID verification cycle. By adding two more stages to the error counter, two more levels of "ID_Match" can be generated: ID_Match_0, ID_March_1, and ID_Match_2. As previously described, ID_Match_0 will toggle "high" when the number of mismatched bits is less than 32 (highest level of security/access), ID_Match_1 will toggle "high" when less than 64 bit mismatches have occurred, and ID_Match_2 will toggle "High" when less than 128 bit mismatches have occurred (lowest level of security/access). The manufacturer will program the OTP EPROM 104 with the pattern necessary to produce the correct number of matched and mismatched bits in the die ID field. The encryption scheme is unchanged.

TABLE 1

Multiple levels of Security/Access

| ID_Match Bits | | | Number of | Level of |
|---|---|---|---|---|
| Match_0 | March_1 | Match_2 | "Error" bits | Security/Access |
| 0 | 0 | 0 | >127 | No Access Allowed, chip NOT functional |
| 0 | 0 | 1 | <128 | Lowest level of security/access |
| 0 | 1 | 1 | <64 | Medium Level of security/access |
| 1 | 1 | 1 | <32 | Highest Level of security/access |

It should be understood that various alternatives to the embodiments of the invention described herein may be employed in practicing the invention. It is intended that the following claims define the scope of the invention and that circuits and methods within the scope of these claims and their equivalents be covered thereby.

What is claimed is:

1. A method of enabling initial operation of an integrated circuit (*IC*) structure that is formed on an [integrated circuit] *IC* die, the [integrated circuit] *IC* die having an on-chip unique number generator formed thereon, the method comprising:

prior to the initial operation of the [integrated circuit] *IC* structure, causing the on-chip unique number generator to generate a multi-bit die ID that is unique to the [integrated circuit] *IC* die;

storing the unique multi-bit die ID on the [integrated circuit] *IC* die as a multi-bit data string;

subsequent to storing the multi-bit data string on the [integrated circuit] *IC* die, causing the on-chip unique number generator to regenerate the unique multi-bit die ID;

comparing the regenerated unique multi-bit die ID and the stored multi-bit data string utilizing comparison circuitry that is formed on the [integrated circuit] *IC* die; and generating an enable signal required for the initial operation of the [integrated circuit] *IC* structure only in the event that the comparison of the regenerated unique multi-bit die ID and the stored multi-bit data string results in match between at least a predefined number of the bits of the regenerated unique multi-bit die ID and the stored multi-bit data string, and wherein the comparing step is performed entirely on the [integrated circuit] *IC* die.

2. [A] *The* method as in claim 1, [and] wherein the storing step comprises storing the multi-bit data string in a non-volatile memory (NVM) element formed on the [integrated circuit] *IC* die.

3. [A] *The* method as in claim 2, [and] wherein the NVM element comprises a one-time programmable *Electronically Programmable Read-Only Memory* (EPROM).

4. [A] *The* method as in claim 1, [ands] wherein the storing step occurs at the wafer sort step in the manufacture of the [integrated circuit] *IC* die.

5. [A] *The* method as in claim 1, [and] wherein the step of storing the unique multi-bit die ID as the multi-bit data string comprises[:] encrypting the unique multi-bit die ID generated by the on-chip unique number generator to provide the multi-bit data string.

6. [A] *The* method as in claim 5, [and] wherein the comparing step comprises[:] decrypting the stored multi-bit data string for comparison with the regenerated unique multi-bit die ID.

7. [A] *The* method as in claim 1, [and] wherein the predefined number of bits is two or greater.

8. [A] *The* method as in claim 1, [and] wherein the predefined number of bits is greater than thirty-two.

9. A method of controlling initial operation of an [integrated circuit] *IC* that is formed on an [integrated circuit] *IC* die, the [integrated circuit] *IC* die have an on-chip unique number generator formed thereon, the method comprising:

prior to the initial operation of the [integrated circuit] *IC*, causing the on-chip unique number generator to generate a multi-bit die ID that is unique to the [integrated circuit] *IC* die;

storing the unique multi-bit die ID on the [integrated circuit] *IC* die as a multi-bit data string;

subsequent to storing the multi-bit data string on the [integrated circuit] *IC* die, and prior to the initial operation of the [integrated circuit] *IC*, causing the on-chip unique number generator to regenerate the unique multi-bit die ID;

utilizing on-chip comparator circuitry formed on the [integrated circuit] *IC* die to compare the regenerated unique multi-bit die ID and the stored multi-bit data string; and in the event that the comparing step results in a match equal to or greater than a predefined number of bits of the regenerated unique multi-bit die ID and the stored multi-bit data string, providing an enable signal to the [integrated circuit] *IC* that is required for the initial operation of the [integrated circuit] *IC*; and in the event that the comparing step results in a match of less than the predefined number of bits of the regenerated unique multi-bit die ID and the stored multi-bit data string, providing a disable signal to the [integrated circuit] *IC* to disable the initial operation of the [integrated circuit] *IC*, and wherein the comparing step is performed entirely on the [integrated circuit] *IC* die.

10. [A] *The* method as in claim 9, [and] wherein the disable signal permanently disables the initial operation of the [integrated circuit] *IC*.

11. [A] *The* method as in claim 9, [and] wherein the stored multi-bit data string is stored in [a non-volatile memory (NVM)] *an NVM* storage structure that is formed on the [integrated circuit] *IC* die.

12. [A] *The* method as in claim 11, [and] wherein the NVM storage structure comprises a one-time programmable EPROM.

13. [A] *The* method as in claim 9, [and] wherein at least a portion of the on-chip comparator circuit is embedded in the [integrated circuit] *IC*.

14. [A] *The* method as in claim 9, [and] wherein the storing step occurs at the wafer sort step on the manufacture of the [integrated circuit] *IC* structure.

15. An on-chip system for enabling the initial operation of an [integrated circuit] *IC* that is formed as part of an [integrated circuit] *IC* die, the system comprising:

an on-chip unique number generator that is formed on the [integrated circuit] *IC* die and that generates a multi-bit die ID that is unique to the [integrated circuit] *IC* die;

[a non-volatile memory (NVM)] *an NVM* storage element that is formed on the [integrated circuit] *IC* die and that, prior to the initial operation of the [integrated circuit] *IC* structure, stores the unique multi-bit die ID as a stored multi-bit data string; and an on-chip comparator that is formed on the [integrated circuit] *IC* die and that, prior to the initial operation of the [integrated circuit] *IC* structure, compares the unique multi-bit die ID that has been regenerated by the on-chip unique number generator and the stored multi-bit data string and that generates an enable signal required for the initial operation of the [integrated circuit] *IC* only in the event that the comparison results in a match of at least a predefined number of the bits of the regenerated unique multi-bit die ID and the stored multi-bit data string, the entire comparison being performed on the [integrated circuit] *IC* die.

16. [A] *The* system as in claim 15, [and] wherein the NVM storage element is formed as a part of the [integrated circuit] *IC*.

17. [A] *The* system as in claim 16, [and] wherein the NVM storage element comprises a one-time programmable EPROM embedded in the [integrated circuit] *IC*.

18. [A] *The* system as in claim 15, [and] wherein at least a part of the on-chip comparator is embedded in the [integrated circuit] *IC*.

19. [A] *The* system as in claim 15, [and] wherein, in the event that the comparison results in a match of less than the predefined number of bits, the comparator generates a disable signal that disables the initial operation of the [integrated circuit] *IC*.

20. [A] *The* system as in claim 19, [and] wherein the disable signal permanently disables the initial operation of the [integrated circuit] *IC*.

*21. An IC comprising:*

*an NVM, wherein a first multi-bit number is stored in the NVM;*

*a number generator that is configured to generate a second multi-bit number, wherein the second multi-bit number is associated with the IC so us to operate as an identifier for the IC;*

*a comparator that is configured to compare corresponding bits from each of the first and second multi-bit numbers and to increment a value with each mismatch between corresponding bits from each of the first and second multi-bit numbers, wherein the comparator is configured to generate a match indicator when there is a match between a predefined number of bits of the first and second multi-bit numbers; and*

*logic that is configured to output an enable signal that is configured to enable functionality of at least a portion of the IC upon receiving the match indicator.*

*22. The IC of claim 21, wherein the first multi-bit number is generated and stored in the NVM at wafer sort.*

*23. The IC of claim 22, wherein the first multi-bit number is stored in a portion of the NVM that is programmable only during wafer sort.*

*24. The IC of claim 23, wherein the portion of the NVM is inaccessible outside the IC.*

*25. The IC of claim 21, wherein the predefined number further comprises a first predefined number, and wherein the portion comprise a first portion, and wherein the match indicator further comprises a first match indicator, wherein the enable signal further comprises a first enable signal, and wherein the comparator is configured to generate a second match indicator when there is a match between a second predefined number of bits of the first and second multi-bit numbers, and wherein the second predefined number of bits is greater than the first predefined number of bits, and wherein the logic is configured to generate a second enable signal that enables functionality of at least a second portion of the IC upon receiving the second match indicator.*

*26. The IC of claim 21, and wherein the output of the comparator further comprises a first output of the comparator, wherein the comparator further comprises:*

*a ripple counter that is coupled to the comparator; and*

*a clocking circuit that is configured to clock the second multi-bit number out of the number generator serially and to clock the first multi-bit number out of the NVM serially, wherein the comparator compares one bit from each of the first and second multi-bit numbers at each clock cycle, and wherein the ripple counter is configured to be incremented each time the comparator first output indicates a mismatch.*

*27. The IC of claim 26, wherein, when the number of mismatches exceeds a predefined maximum count, the comparator is disabled.*

*28. The IC of claim 26, wherein the logic outputs the signal after the number of mismatches exceeds a predefined minimum count.*

*29. The IC of claim 21, wherein the first multi-bit number that is stored in the NVM is generated by the number generator, encrypted, and then programmed into the NVM.*

*30. The IC of claim 29, wherein the IC further comprises a decrypting circuit that is configured to selectively decrypt the first multi-bit number before the comparator performs the comparison.*

*31. A method comprising:*

*generating a first multi-bit number in an IC, wherein the first multi-bit number is associated with the IC so as to operate as an identifier for the IC;*

*retrieving a second multi-bit number from an NVM;*

*in the IC, sequentially comparing corresponding bits from the first and second multi-bit numbers over a plurality of clock cycles, wherein at least one comparison is performed during each clock cycle;*

*incrementing a value with each mismatch between corresponding bits from each of the first and second multi-bit numbers; and*

*enabling functionality of at least a portion of the IC when the value reaches a predefined number.*

*32. The method of claim 31, wherein the method further comprises, at wafer sort:*

*generating the second multi-bit number; and*

*programming the second multi-bit number into the NVM.*

*33. The method of claim 32, wherein the step of programming further comprises programming the second multi-bit*

*number into a portion of the NVM during wafer sort, wherein the portion of the NVM has read-only accessibility following packaging.*

*34. The method of claim 31, wherein the method further comprises halting the step of sequentially comparing when the value exceeds a predefined maximum count.*

*35. The method of claim 31, wherein the method further comprises allowing the step of enabling to be performed when the value exceeds a predefined minimum count.*

*36. The method of claim 31, wherein the method further comprises:*

*generating the second multi-bit number;*

*encrypting the second multi-bit number; and*

*programming the encrypted second multi-bit number into the NVM.*

*37. An IC comprising:*

*an NVM;*

*a number generator for generating multi-bit numbers;*

*a multi-bit number selectively stored in the NVM;*

*a comparator for comparing in turn the bit value of each bit of a generated multi-bit number to the bit value of a corresponding bit of the multi-bit number stored in the NVM;*

*a first output from the comparator indicating whether there is a match between a first predefined number of bits of the generated multi-bit number and the stored multi-bit number;*

*logic configured for outputting a first signal enabling functionality of at least a first portion of the IC upon the first output indicating a match;*

*a second output from the comparator indicating whether there is a match between a second predefined number of bits of the generated multi-bit number and the stored multi-bit number, wherein the second predefined number of bits is greater than the first predefined number of bits; and*

*a second signal from the logic enabling functionality of at least a second portion of the IC upon the second output indicating a match.*

*38. An IC comprising:*

*an NVM;*

*a number generator for generating multi-bit numbers;*

*a multi-bit number selectively stored in the NVM;*

*a comparator for comparing a generated multi-bit number to the multi-bit number stored in the NVM;*

*a first output from the comparator indicating whether there is a match between a first predefined number of bits of the generated multi-bit number and the stored multi-bit number;*

*logic configured for outputting a first signal enabling functionality of at least a first portion of the IC upon the first output indicating a match;*

*a ripple counter connected to the first output of the comparator; and*

*a clocking circuit that clocks the generated multi-bit number out of the number generator serially, and clocks the stored multi-bit number out of the NVM serially, wherein the comparator compares one bit from each of the multi-bit numbers at each clock, and wherein the ripple counter is incremented each time the first output of the comparator indicates a mismatch.*

*39. The IC of claim 38, wherein when the number of mismatches exceeds a predefined maximum count, the comparator is disabled so that the logic does not output the first signal.*

*40. The IC of claim 38, wherein the logic outputs the first signal only after the number of mismatches exceeds a predefined minimum count.*

*41. An IC comprising:*

*an NVM having a first identification number stored therein, wherein the first identification number is stored in the NVM during the manufacture of the IC;*

*a number generator that is configured to generate a second identification number;*

*an identification comparator having:*

*a first logic circuit that is coupled to the number generator and the NVM;*

*a ripple counter that is coupled to the first logic circuit, wherein the ripple counter is configured to count the number of mismatches between corresponding bits from each of the first and second identification numbers; and*

*a second logic circuit that is coupled to the ripple counter that is configured to generate an enable signal if there is a match between a predefined number of bits of the first and second identification numbers.*

*42. The IC of claim 41, wherein the first logic circuit further comprises:*

*a first logic gate that is coupled to the number generator and the NVM; and*

*a second logic gate that is coupled to the first logic gate and the ripple counter.*

*43. The IC of claim 42, wherein the enable signal further comprises a plurality of enable signals, and wherein the second logic circuit further comprises:*

*a plurality of flip-flops, wherein each flip-flop is coupled to the ripple counter; and*

*a set of logic gates that each output at least one of the enable signals, wherein each logic gate from the set of logic gates is coupled to at least one of the flip-flops.*

*44. The IC of claim 43, wherein the first identification number is encrypted wherein the identification comparator further comprises a decryption circuit that is coupled between the NVM and the first logic gate.*

*45. The IC of claim 44, wherein the first logic gate, the second logic gate, and each logic gate from the set of logic gates further comprises an XOR gate, a NAND gate, and a NAND gate, respectively.*

*46. The IC of claim 45, wherein each flip-flop further comprises an RS flip-flop.*

* * * * *